May 4, 1965  J. W. DUHN  3,182,120
SNAP-ON INSULATING GROMMETS
Filed Sept. 24, 1962

INVENTOR.
JENS WILLIAM DUHN
BY
Barnes, Kisselle, Raisch & Choate
ATTORNEYS

United States Patent Office 3,182,120
Patented May 4, 1965

3,182,120
SNAP-ON INSULATING GROMMETS
Jens William Duhn, Detroit, Mich., assignor to Automotive Rubber Co., Inc., Detroit, Mich., a corporation of Michigan
Filed Sept. 24, 1962, Ser. No. 225,503
7 Claims. (Cl. 174—151)

This invention relates to insulating grommets which are used to insulate wires, cables and pipes from a panel through which they are threaded.

In various automotive and aeronautical applications, it is necessary to thread wires, cables or pipes through an opening in a wall or panel. It is desirable and often necessary that these items be insulated electrically from the panel. In addition, because of the great emphasis being placed on sound proofing and moisture proofing, it is desirable that the arrangement be such that sound and moisture will not be transmitted by movement of the wires, cables or pipes relative to the panel. Heretofore, grommets have been made by dipping or pressure molding the resilient materials comprising the grommets about a clip or the like.

In the copending application of Phillip V. Millard, Serial No. 80,444 filed January 3, 1961 and titled Insulating Grommets, having a common assignee with the present application, there is disclosed a grommet comprising a body of soft resilient material having a relatively rigid ring embedded therein. The body has an annular contacting surface which is adapted to engage the edge of the opening in the panel on which the grommet is mounted. The ring includes integral fingers or prongs which extend generally axially through the annular contacting surface and are adapted to snap in and engage the periphery of the opening in the panel to hold the grommet in position and, in addition, to compress the material comprising the annular sealing surface around the edge of the opening. The grommet includes one or more axially extending openings through which the wire, cable or pipe is threaded.

In the aforementioned copending application, a novel method and apparatus for forming the grommets is disclosed and comprises positioning the ring in an open mold with the prongs extending upwardly, the outer edge of the ring engaging projections or a shoulder in the side wall of the mold thereby holding the ring in spaced relation to the bottom of the mold. A predetermined quantity of an uncured elastomeric composition in liquid form is poured into the mold and the elastomer is cured. When the resultant grommet is removed from the mold it has been accurately formed and the ring is embedded in the interior thereof with the prongs extending outwardly. A preferred type of elastomeric composition comprises what are commonly known as plastisols. Closed cell foamed plastisols are disclosed as especially suitable for such grommets.

It is an object of this invention to provide an improved insulating grommet which can be applied after the wire, cable or pipe have been threaded through the opening in the panel.

Basically, the invention comprises providing a slit in the body ring and in the hook finger of the grommet, which slit extends radially outwardly from the body of the grommet to the periphery of the grommet. By this arrangement, the grommet can be readily opened to permit slipping over the wire, cable or pipe so that they need not be threaded through the grommet. The provision of the slit through the hook finger provides for positive closing of the slit when the grommet is snapped into position by pushing the snap fingers past the edge of the opening in the panel.

Figure 1:
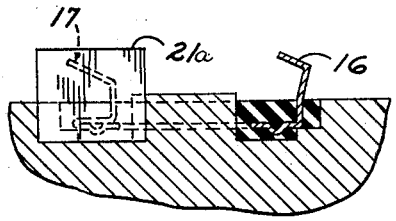
FIG. 1 is a fragmentary vertical section through a mold for making the grommet embodying the invention.
Figure 2:
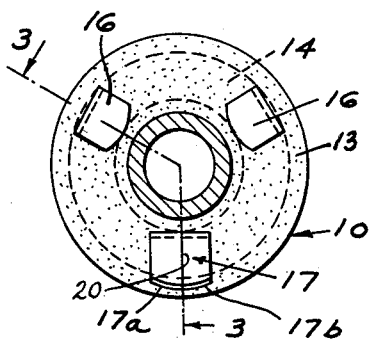
FIG. 2 is a plan view of an insulating grommet embodying the invention.
Figure 3:
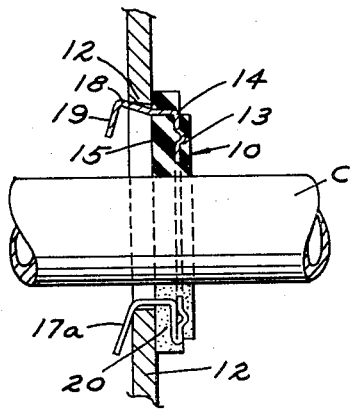
FIG. 3 is a sectional view taken along the line 3—3 in FIG. 2 showing the grommet in position in an opening in a panel.

Referring to FIGS. 2 and 3, grommet 10 embodying the invention is adapted to be mounted in an opening 11 of a vertical panel 12. As further shown in FIG. 1, the grommet 10 comprises a generally cylindrical body 13 of soft resilient material such as foamed rubber, foamed plastic or soft dense plastic. Body 13 is of generally uniform axial thickness and a ring 14 is embedded in the body 13. Body 13 thus includes a flat annular surface 15 which is adapted to engage the edge of the opening 11.

As shown in the drawings, ring 14 is positioned axially relative to the body 13 near the surface of the body 13 which is remote from the surface 15 and includes circumferentially spaced integral resilient fingers 16, shaped in the form of spring members, and a hook finger 17 that are adapted to engage the sides of the opening 11 to hold the grommet in position, compressing the body 13 so that the surface 15 engages the edge of the opening 11. Finger 17 extends outwardly and hooks over and engages the edge of opening 11. As shown in FIG. 2, each resilient finger 16 includes an outwardly extending portion 18 and inwardly extending portion 19.

According to the invention, the hook finger 17, ring 14 and the body 13 are slit along a radial plane as at 20. This divides the hook finger 17 into two parts 17a, 17b. In applying the grommet, it is first passed over the cable, wire or the like C by grasping the portions 17a, 17b and spreading them apart and, at the same time, axially. This provides a sufficient space to force the grommet over the cable C into the opening in the grommet. When the portions 17a, 17b are released, the grommet can be applied to the opening in the wall 12 by hooking finger 17 over the edge of opening 11 and by forcing the resilient fingers 16 axially through the opening, momentarily bending the fingers 16 inwardly so that after they pass through the opening they return to their original position. This draws the ring 14 and, in turn, the body 13 axially toward the opening 11 and compresses the portion 15 of the body 13 which contacts the edge of the opening against the opening. The compression and the softness of the material is such that the material is partially deformed into the opening 11. The compressive force provided by the edge of the opening 11 on the resilient fingers 16 acts through the ring 14 to force the portions 17a, 17b of the hook 17 against one another and, in turn, the adjacent faces of the slit portion of the body toward one another to close the grommet tightly about the cable so that there is no possibility of leakage through the slot 20.

Figure 4:
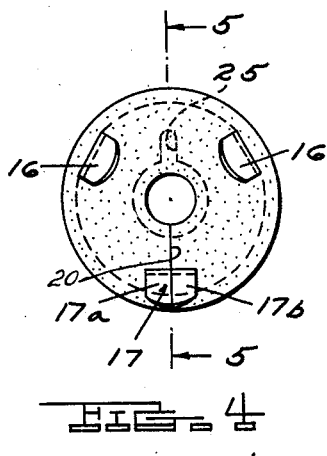
FIG. 4 is a plan view of a further modified form of grommet.
Figure 5:
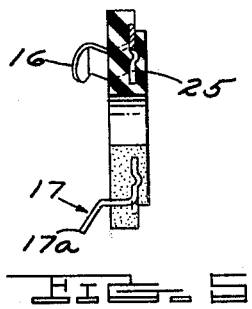
FIG. 5 is a sectional view taken along the line 5—5 in FIG. 5.

In the form of the invention shown in FIG. 4 a radial slot 25 is provided opposite slit 20 to facilitate the spreading apart of the portions 17a, 17b where the ring has a substantial radial width.

Figure 6:
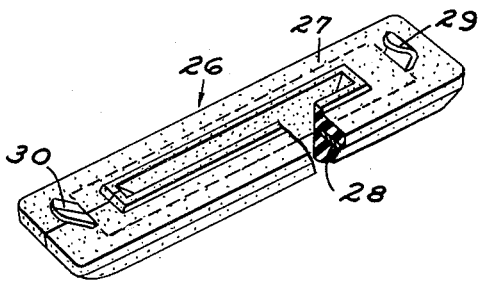
FIG. 6 is a part sectional perspective view of a modified form of grommet.

In the form of the invention shown in FIG. 6, the grommet 26 is intended for supporting a thin wide element and comprises a body 27 and an embedded rectangular ring 28 having a resilient finger 29 similar to fingers 16 and an opposed split hook finger 30. The grommet 26 is applied in the same manner as the other forms of grommets.

The grommet 10 is preferably made by foaming or casting the soft resilient material in place about the ring 14 as shown in FIG. 1. An insert 21a of thin metal is placed between the finger portions 17a, 17b. The ring 14 is then placed in position with the fingers 16, 17 extending upwardly and the foamed plastic is poured into the mold to fill the mold 22 as shown in FIG. 1. The plastic is then cured in an oven or at room temperature, if it is of the room temperature curing type, and the grommet is removed from the mold.

Various resilient materials can be used. Foam rubber and foamed plastic are preferred because of their resiliency. Examples of materials which produce satisfactory results and the formulations involved are as follows:

*Example I*

A latex foam sponge composition which produces satisfactory results is of the following composition in parts by weight:

| | |
|---|---|
| 62% de-ammoniated natural latex | 100.0 |
| 20% potassium oleate soap | 1.4 |
| 55% ethyl zimate dispersion | 1.0 |
| 73% sulfur dispersion | 2.0 |
| 65% agerite spar emulsion | 1.0 |
| 50% zetax dispersion | .25 |
| Foam stabilizer | As required |
| 50% zinc oxide dispersion | 5.0 |
| 20% sodium silicofluoride dispersion | As required |

*Example II*

A vinyl plastic sponge composition producing satisfactory results has the following composition in parts by weight:

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 15–30 |
| Monomeric plasticizers | 75–115 |
| Diluent plasticizers | 5–15 |
| Color | 1.0 |
| Blowing | 1.0 |

*Example III*

A soft dense vinyl material which produces satisfactory results has the following composition in parts by weight:

| | |
|---|---|
| Copolymer vinyl resin | 100.0 |
| Vinyl stabilizer | 1.0 |
| CaO | 1.0 |
| Solvating depressant | 4.0 |
| Polymeric plasticizers | 60.0 |
| Monomeric plasticizers | 250.0 |
| Color | 1.0 |

It can thus be seen that there has been provided an improved grommet that can be applied over wires, cables, and the like after they have been threaded through a panel.

I claim:

1. An insulating grommet comprising
   a body of soft resilient material defining a diaphragm,
   said diaphragm constituting a major portion of said grommet,
   said diaphragm having at least one opening therethrough with the periphery of said opening being adapted to sealingly engage a member supported by said grommet,
   a first finger embedded in said diaphragm and shaped in the form of a hook to engage the edge of an opening in a wall,
   a resilient finger shaped as a spring member embedded in said diaphragm and projecting outwardly from one side thereof, said resilient finger having a portion shaped to resiliently snap by and engage the edge of said wall opening,
   said first finger and said body having a slit extending from said diaphragm opening radially outwardly through said body and said first finger to the periphery of said grommet.

2. An insulating grommet comprising
   a body of soft resilient material defining a diaphragm,
   said diaphragm constituting a major portion of said grommet,
   said diaphragm having at least one opening therethrough with the periphery of said opening being adapted to sealingly engage a member supported by said grommet,
   a first finger embedded in said diaphragm and shaped in the form of a hook to hook over the edge of an opening in a wall,
   a plurality of spaced resilient fingers embedded in said diaphragm shaped as spring members and projecting outwardly from one side thereof to resiliently snap by and engage the edge of said wall opening,
   said first finger and said body having a slit extending radially from said diaphragm opening outwardly through said body and said first finger to the periphery of said grommet.

3. An insulating grommet comprising
   a body of soft resilient material including an opening and an annular portion,
   said annular portion having an annular contacting surface lying in a plane which is at right angle to the axis of the body,
   a ring positioned in said annular portion in concentric relation thereto,
   and a plurality of spaced spring fingers projecting axially through the annular surface and shaped to engage the edges of an opening in a panel and thereby compress the material of said annular portion against the edge of said opening in said panel,
   said grommet having a slit extending radially from said body opening to the periphery thereof and through said body, ring and one of said fingers.

4. The combination set forth in claim 3 wherein said ring is circular.

5. The combination set forth in claim 3 wherein said ring is rectangular,
   said fingers being positioned diametrically opposite one another.

6. The combination set forth in claim 3 including a radial slot in said ring extending radially outwardly from the inner edge thereof through a portion of the radial width thereof and opposite said slit.

7. An insulating grommet comprising
   a body of soft resilient material including an opening and an annular portion,
   said annular portion having an annular contacting surface lying in a plane which is at a right angle to the axis of the body, a ring positioned in said annular portion and concentrically related thereto,
said body being cast in situ about said ring,
and a plurality of spaced integral spring fingers on said ring projecting axially through the annular surface and shaped to engage the edges of an opening in a panel and thereby compress the material of said annular portion against the edge of said opening in said panel,
said grommet having a slit extending radially from said body opening to the periphery thereof and through said body, ring and one of said fingers.

References Cited by the Examiner

UNITED STATES PATENTS

| 58,594 | 10/66 | Burnap et al. | |
|---|---|---|---|
| 2,186,277 | 1/40 | Tetens. | |
| 2,382,970 | 8/45 | Borcherdt. | |
| 2,427,742 | 9/47 | Peterson et al. | |
| 2,606,227 | 8/52 | Clayton | 174—50 |
| 2,668,316 | 2/54 | Sturtevant et al. | 174—153 |

JOHN F. BURNS, *Primary Examiner.*

JOHN P. WILDMAN, *Examiner.*